(12) United States Patent
Harris et al.

(10) Patent No.: US 8,329,794 B2
(45) Date of Patent: Dec. 11, 2012

(54) COMPATIBILIZED SILICA IN NITRILE RUBBER AND BLENDS OF NITRILE RUBBER AND STYRENE BUTADIENE RUBBER COMPOSITIONS

(75) Inventors: Lawrence Douglas Harris, Baton Rouge, LA (US); Harold William Young, Baton Rouge, LA (US); Deepak Rasiklal Parikh, Beaumont, TX (US); Daniel Courtney Patton, Jackson, LA (US); Vernon Vincent Vanis, Spring, TX (US)

(73) Assignee: Lion Copolymer, LLC, Baton Rouge, LA (US)

( * ) Notice: Subject to any disclaimer, the term of this patent is extended or adjusted under 35 U.S.C. 154(b) by 62 days.

(21) Appl. No.: 12/984,280

(22) Filed: Jan. 4, 2011

(65) Prior Publication Data

US 2011/0165356 A1 Jul. 7, 2011

Related U.S. Application Data

(60) Provisional application No. 61/292,917, filed on Jan. 7, 2010.

(51) Int. Cl.
| | |
|---|---|
| *B60C 1/00* | (2006.01) |
| *C08K 5/15* | (2006.01) |
| *C08K 9/00* | (2006.01) |
| *C08K 9/06* | (2006.01) |
| *B27K 5/00* | (2006.01) |
| *C08G 18/38* | (2006.01) |
| *C08L 9/06* | (2006.01) |
| *C07F 7/18* | (2006.01) |

(52) U.S. Cl. .......... 524/262; 524/261; 524/114; 524/15; 524/35; 524/65; 524/188; 523/212; 523/213; 523/200

(58) Field of Classification Search .................. 524/262, 524/261, 114, 15, 35, 65, 188; 523/212, 523/213, 200

See application file for complete search history.

(56) References Cited

U.S. PATENT DOCUMENTS

| | | | |
|---|---|---|---|
| 4,076,769 A | 2/1978 | Watts | |
| 4,213,888 A | 7/1980 | Karg et al. | |
| 5,093,407 A | 3/1992 | Komai et al. | |
| 5,304,591 A | 4/1994 | Nowakowsky et al. | |
| 5,504,168 A | 4/1996 | Maestri et al. | |
| 5,985,953 A * | 11/1999 | Lightsey et al. | 523/212 |
| 6,403,693 B2 | 6/2002 | Materne et al. | |
| 6,579,929 B1 | 6/2003 | Cole et al. | |
| 6,635,700 B2 | 10/2003 | Cruse et al. | |
| 7,585,914 B2 | 9/2009 | Tsou et al. | |
| 2004/0071626 A1 | 4/2004 | Smith et al. | |
| 2006/0100320 A1 | 5/2006 | Dalphond et al. | |
| 2007/0106024 A1 | 5/2007 | Tsou et al. | |
| 2007/0260005 A1 * | 11/2007 | Karato et al. | 524/458 |
| 2008/0221274 A1 | 9/2008 | Jourdain | |
| 2009/0124730 A1 | 5/2009 | Matsuda et al. | |
| 2010/0113681 A1 * | 5/2010 | O'Brien et al. | 524/547 |

FOREIGN PATENT DOCUMENTS

JP   2005-33019 A   12/2005

OTHER PUBLICATIONS

Perez, et al. "Effect of the Filler Characteristics on Miscibility of Styrene-Butadiene Rubber and Nitrile-Butadiene Rubber Blends." Polymer Engineering and Science [online], Published online Aug. 25, 2008; Retrieved from the Internet: <URL: http://onlinelibrary.wiley.com.

* cited by examiner

*Primary Examiner* — William Cheung
(74) *Attorney, Agent, or Firm* — Buskop Law Group, PC; Wendy Buskop

(57) ABSTRACT

A polymer composition of a compatibilized silica in blends of acrylonitrile butadiene polymer and styrene butadiene polymer comprising six to ninety percent by weight of a compatibilized silica, at least one percent by weight of a coupling agent, at least one percent by weight of a styrene butadiene polymer, and at least one percent by weight of an acrylonitrile butadiene polymer is described herein. The polymer composition can have a minimum amount of at least ten percent by weight of 15:50 ratio, acrylonitrile to butadiene polymer, with the remainder being compatibilized silica.

20 Claims, No Drawings

COMPATIBILIZED SILICA IN NITRILE RUBBER AND BLENDS OF NITRILE RUBBER AND STYRENE BUTADIENE RUBBER COMPOSITIONS

CROSS REFERENCE TO RELATED APPLICATIONS

The present application claims priority to and the benefit of U.S. Provisional Patent Application Ser. No. 61/292,917 filed on Jan. 7, 2010, entitled "COMPATIBILIZED SILICA IN NITRILE RUBBER AND BLENDS OF NITRILE RUBBER AND STYRENE BUTADIENE RUBBER COMPOSITIONS". This reference is hereby incorporated in its entirety.

FIELD

The present embodiments generally relate to polymeric compositions that are resistant to chemical and biological invasion or hazards, including flesh eating organisms and toxic chemicals.

BACKGROUND

A need exists to provide a polymeric composition that has uniform filler dispersion, is easy to make, contains UV stabilizers, has a high density, is lightweight, and can resist chemical warfare compositions.

A further need exists for an article usable to resist biological warfare that can protect users.

The present embodiments meet these needs.

DETAILED DESCRIPTION OF THE EMBODIMENTS

Before explaining the present composition and articles in detail, it is to be understood that the composition and articles are not limited to the particular embodiments and that the composition and articles can be practiced or carried out in various ways.

One or more embodiments can include a polymer composition that can have from about 6 percent to 90 percent by weight (wt %) of a compatibilized silica, at least 1 percent by weight of a coupling agent, at least 10 percent by weight of a styrene butadiene polymer, and at least 10 percent by weight of an acrylonitrile butadiene polymer.

The polymer composition, also referred to herein as polymer blend, can be strong for use in tires, ballistic clothing, and shielding for personnel, while remaining flexible, durable, and able to withstand temperatures of as low as −35 degrees Celsius (C) without deforming. The polymer blend can have an ability to accept fillers without coming apart.

In embodiments, the polymer composition can include a minimum amount of at least 10 percent by weight of an emulsion polymerized acrylonitrile butadiene polymer with the remainder consisting of the compatibilized silica. The butadiene can be liquid 1,3-butadiene.

The compatibilized silica can have an organosilicon coupling agent bound to its surface, with from about 2 percent to about 10 percent by weight of organosilicon per weight of silica, thereby forming the compatibilized silica.

In embodiments, the polymer composition can be a blend of polymers.

The polymers can be: polyolefin, polyalphaolefin, polyesters, polyamide, polycarbonates, polyphenylene oxide, polyacrylate, polyurethane, terpolymer of ethylene propylene and a non-conjugated diene, fluoroelastomer, chloro-elastomers, polyisoprene, polybutadiene, polyisobutyldiene, polychloroprene, polyvinyl chloride, styrene butadiene rubber, acrylonitrile butadiene rubber, polyepoxide, ethylene interpolymers, block copolymers of styrene butadiene, cross-linked polymers of the above list, homo polymers and block copolymers of styrene isoprene, copolymers of acrylates, vinyl monomers, or combinations thereof.

The polymer composition with the compatibilized silica in blends of acrylonitrile butadiene polymer can also include polyvinyl chloride polymer.

From about 20 percent to about 50 percent by weight of the polyvinyl chloride polymer can be used with at least 10 percent by weight of the acrylonitrile butadiene polymer. The polymer composition can include a minimum amount of at least 10 percent by weight of 15:50 acrylonitrile to butadiene polymer, with the remainder consisting of the compatibilized silica.

One or more embodiments relate to articles formed from or made of the polymer composition described herein. The article can include a floor mat, a tire, a belt, a roller, a gasket printer's roller, an o-ring, shoes, footwear, wire and cable jacketing, roof edging, a tubular, a garden hose or pipe, a marine impact bumper, such as a side bumper used for the docking of a boat, an industrial belt, non-latex gloves, non-automotive tires, a mining belt, a bearing, a gas mask, a conduit, or a pneumatic tire used on bikes, cars, or airplanes.

The formed article can be chemical resistant to biological and chemically warfare components, for use as gas masks, boots for soldiers, protective clothing to resist arc flashing, and clothing that protects against biological organisms that eat flesh.

The organosilicon can be present as an average tetrameric structure having a $T^3/T^2$ ratio of 0.75 or greater as measured by $^{29}Si$ CPMAS NMR. The terms "$T^2$" and "$T^3$" refer to bi(T2)- and tri(T3)-fold Si—O-linked silicons. "Si CPMAS NMR" refers to silicon cross polarization magic angle spinning nuclear magnetic resonance, with $^{29}$ referring to the atomic weight of the isotope of silicon being analyzed.

The coupling agent can be bound to a surface of the silica in amounts from about 1 percent to about 25 percent by weight of organosilicon based on the weight of the silica.

The compatibilized silica can have a $T^3/T^2$ ratio of 0.9 or greater as measured by $^{29}Si$ CPMAS NMR.

The compatibilized silica and nitrile polymer blend in latex form can have a nitrile polymer with a Mooney viscosity, (ML 1+4 at 100 C), from 10 to 100, and an acrylonitrile composition ranging from 10 percent to 50 percent by weight.

The process of making the polymer composition can be carried out while the polymers are in latex form. Emulsion polymerized latex, as the term is herein used, refers to the reaction mixture prior to the coagulation stage in an emulsion polymerization process.

In one or more embodiments, fillers can be added to the polymer composition, such as carbon black. The polymer composition can include from about 1 percent to about 50 percent by weight of a carbon black, which can be a mixture of two different carbon blacks.

As such, silica-carbon black compositions can be attainable with uniform high loads of total filler and quantitative incorporation of the fillers.

The polymer composition can include other polymers made in latex form including conjugated diene-based polymers, polymers based on vinyl monomers, and combinations of conjugated dienes with vinyl monomers.

Suitable vinyl monomers can include styrene, alpha.-methylstyrene, alkyl substituted styrenes, vinyl toluene, divinylbenzene, acrylonitrile, vinylchloride, methacrylonitrile, isobutylene, maleic anhydride, acrylic esters and acids, methylacrylic esters, vinyl ethers, vinyl pyridines, and the like.

The polymer composition can include natural rubber, styrene-butadiene rubber (SBR), acrylonitrile-butadiene rubber (NBR), acrylonitrile-butadiene-styrene polymer (ABS), polybutadienes, polyvinylchloride (PVC), polystyrene, polyvinylacetate, butadiene-vinyl pyridine polymers, polyisoprenes, polychloroprene, neoprene, styrene-acrylonitrile copolymer (SAN), blends of acrylonitrile-butadiene rubber with polyvinylchloride, and the like.

The polymer composition can have at least one copolymer, a homopolymer, a cross-linked polymer, a partially cross-linked polymer, or combinations thereof.

The polymer composition can be made by treating a silica with a coupling agent in aqueous suspension to form a compatibilized silica slurry. The compatibilized silica slurry can have an aqueous portion and a compatibilized silica.

The compatibilized silica can have an organosilicon bound to its surface at 2 percent to 25 percent by weight of an organosilicon per weight of silica. The compatibilized silica can have an average particle size between 1 nanometer (nm) and 15 microns.

Silica that is not agglomerated can have an average particle size ranging between 1 nanometer and 15 microns.

The silica can be a fumed silica, such as a pyrogenic silica, an amorphous silica, such as diatomaceous earth, faujasite, or combinations thereof.

Finely divided silica can be formed into an aqueous slurry and treated with a solution of a coupling agent, which can chemically bind to the silica surface. A variety of compounds known in the prior art can be used as the coupling agent for coupling hydrophilic filler materials, such as glass fibers, silica, and the like, to hydrophobic materials, such as natural and synthetic polymers useful as rubbers or thermoplastic materials. Organosilicon compounds are well known for bonding silica to natural and synthetic polymers.

In one or more embodiments, the coupling agent can have a structure similar to:

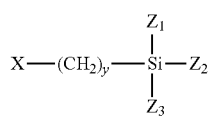

Within the structure above, "X" can have a functional group selected from the group consisting of an amino group, a polyamino alkyl group, a mercapto group, a polysulfide, an epoxy group, a vinyl group, an acryloxy group, and a methacryloxy group.

Within the structure above, "Y" can be an integer equal to or greater than 0.

Within the structure above, $Z_1$, $Z_2$, and $Z_3$ can be each independently selected from the group consisting of: hydrogen, $C_1$-$C_{18}$ alkyl, aryl, cycloalkyl, aryl alkoxy, and halo-substituted alkyl. At least one of $Z_1$, $Z_2$, or $Z_3$ can be an alkoxy, a hydrogen, a halogen, or a hydroxyl.

The silica can be nano-sized silica, such as polyhedral oligomeric silsesquioxane (POSS).

The coupling agent can be a silane or another organosilicon compound. An organosilicon compound is one that contains carbon-silicon bonds.

In embodiments, the amount of coupling agent can range from about 1 part to about 25 parts by weight of coupling agent per 100 parts by weight of silica.

In embodiments, the organosilicon compound can have from one to three readily hydrolyzable groups attached directly to the silicon atom, and at least one organic group attached directly to the silicon atom. Representative of the hydrolyzable groups commonly employed in such coupling agents include: halogens, hydrogen, hydroxyl, lower alkoxy groups, such as methoxy, ethoxy, propoxy, and like groups.

The organic group attached directly to the silicon atom can have or include at least one functional group. The functional group can be a functional group capable of undergoing a chemical reaction with the polymer during curing of the polymer.

For example, in embodiments in which the polymer composition is made with a styrene-butadiene rubber, which can be cured via cross-linking reactions involving sulfur compounds, the coupling agent can be an organosilicon compound with at least one organic group being a mercapto, a polysulfide, a thiocyanato (—SCN), or a halogen and/or amino functionality. Correspondingly, at least one organic group of the organosilicon compound can have ethylenic unsaturation or an epoxy group, such that the silica filled polymer can undergo a peroxy type of curing reaction.

The coupling agent can be or include bis(trialkoxysilylalkyl)polysulfide, or those from the group consisting of: trialkylsilanes, dialkylsilanes, trialkylalkoxysilanes, trialkylhalosilanes, dialkyalkoxysilanes, dialkyldialkoxysilanes, dialkylalkoxyhalosilanes, trialkylsilanols, alkyltrialkoxysilanes, alkyldialkoxysilanes, alkyldialkoxyhalosilanes, and monoalkylsilanes with the alkyl group being a $C_1$ to $C_{18}$ linear, cyclic, or branched hydrocarbon, or combinations thereof. In one or more embodiments, one or two alkyl groups can be replaced with a phenyl or benzyl group, or one to two alkyl groups can be replaced with a phenyl, benzyl, or alkoxy substituted alkyl group.

The bis(trialkoxysilylalkyl)polysulfide can have or include from 2 sulfur atoms to 8 sulfur atoms, in which the alkyl groups can be $C_1$-$C_{18}$ alkyl groups, and the alkoxy groups can be $C_1$-$C_8$ alkoxy groups.

The polymer can be recovered once it has been coagulated and once the polymer has been contacted with the compatibilized silica slurry.

The aqueous suspension can include water, soaps, emulsifiers, surfactants, and thickeners including viscosity modifiers, such as starch or carboxy methyl cellulose.

An activator, a free radical initiator, and a terminating agent can all be used in the emulsion polymerization process in amounts from 0.1 percent to 5 percent by weight in combination. The activator can be a peroxide.

In embodiments, a curing package for crosslinking the formed polymers can be used with the emulsion polymerization process, such as a zinc oxide, another organic peroxide, or an acrylate.

In one or more embodiments, the compatibilized silica slurry can contain from 1 percent to 30 percent by weight silica. For example, the compatibilized silica slurry can contain about 10 percent to about 15 percent by weight of silica, and up to 20 percent by weight of the coupling agent.

Temperature and reaction times can be varied within wide limits during the blending. In embodiments, temperatures can range from ambient up to about 125 degrees Celsius. The blending can be performed using impeller agitation. The amount of time used for effecting the reaction between the hydrolyzed coupling agent and the silica can be varied within relatively wide limits ranging from 4 hours to 48 hours, depending on the temperature employed.

The amount of the silica added to the latex can be varied within wide ranges, depending in part on the coupling agent employed, the nature of the polymer, the use of other fillers, such as carbon black, and the end use to which that polymer is subjected. For example, the amount of the silica added to the latex or latexes can range from about 25 percent to about 80 percent by weight.

In embodiments, the compatibilized silica slurry can be within the range of about 5 percent to about 60 percent based on the weight of the solids in the polymer latex.

The process can also include blending at least a portion of the compatibilized silica slurry with a styrene butadiene polymer latex, forming a silica styrene butadiene polymer latex that can be a flowing and pourable emulsion at ambient temperatures.

The portion of the compatibilized silica slurry with the styrene butadiene polymer latex can be blended by pumping each to a common tank and agitating the mixture at a rate sufficient to keep the emulsion in suspension at operating temperatures. For example, the mixture can be agitated using impeller agitation.

The silica styrene butadiene polymer latex can include a ratio of about 25:75 of the compatibilized silica slurry to the styrene butadiene polymer latex.

In one or more embodiments, at least a portion of the compatibilized silica slurry can be blended into an acrylonitrile butadiene polymer latex, forming a silica acrylonitrile butadiene polymer latex.

The portion of the compatibilized silica slurry with the acrylonitrile butadiene polymer latex can be blended by pumping each to a common tank and agitating the mixture at a rate sufficient to keep the emulsion in suspension at operating temperatures.

The formed silica acrylonitrile butadiene polymer latex can include a ratio of about 25:75 of the compatibilized silica slurry to the formed silica acrylonitrile butadiene polymer latex.

At least one of the polymers can be or include a copolymer, a homopolymer, a cross-linked polymer, partially cross-linked polymer, or combinations thereof. At least one of the polymers can be natural or synthetic polymers.

Acrylonitrile butadiene polymer latex can be mixed with a polyisoprene, such as a natural rubber, a synthetic rubber, a rubber latex blend, rubber crumbs, or combinations thereof.

A portion of the silica styrene butadiene polymer latex can be blended with the silica acrylonitrile butadiene polymer latex, forming the compatibilized silica and nitrile polymer blend.

The silica styrene butadiene polymer latex with the silica acrylonitrile butadiene polymer latex can be blended by flowing the latexes into a common tank and agitating. The polymer latexes can be blended to have a ratio of acrylonitrile to styrene from 3:1 to 8:1, a ratio of styrene to butadiene from 0.06:1 to 0.14:1, a ratio of butadiene to styrene from 7:1 to 14:1, a ratio of acrylonitrile to butadiene of 0.4:1 to 0.75:1, and a ratio of butadiene to acrylonitrile from 1.3:1 to 2.5:1.

One or more embodiments of the process can include adding a carbon black slurry to at least one of the latexes. The carbon black slurry can be or include furnace carbon black, which can include high structure carbon black, low structure carbon black, and acetylene carbon black.

The carbon black slurry can be added by flowing the carbon black into the common tank, as described above. For example, from about 1 percent to about 50 percent by weight of the carbon black slurry can be added to one or more of the common tanks.

The polymer composition can include an extender oil, an antioxidant, or any combination thereof, which can be added to at least one of the latexes. For example, from about 4 percent to about 60 percent by weight of the extender oil can be added to at least one of the polymer latexes, from about 0.1 percent to about 3 percent by weight of the antioxidant can be added to at least one of the polymer latexes, or combinations thereof.

The extender oil can be naphthenic oil, a hydrocarbon based oil, a synthetic oil, an aromatic oil, a low polycyclic aromatic hydrocarbon oil (PAH), or combinations thereof.

The antioxidant can be a phenolic antioxidant, a phosphite, bis-phenols, an amine antioxidant, or combinations thereof.

The polymer composition can include fillers, which can be added to any one or more of these blends. For example, from 0.1 percent to 50 percent by weight of a member of the group consisting of: diatomaceous earth, ground pecan shells, cellulosic materials, ground peanut shells, talc, ground coal, ground bagasse, ash, perlite, silage, clay, calcium carbonate, biomass, or combinations thereof can be added to one or more of these blends.

One or more embodiments can include a compatibilized silica in a latex blend of acrylonitrile butadiene polymer and styrene butadiene polymer.

At least a portion of the styrene butadiene polymer latex can be blended with the acrylonitrile butadiene polymer latex, forming an acrylonitrile and styrene butadiene polymer latex blend that can be a flowing and pourable emulsion at ambient temperatures.

The coupling agent can have the capacity to chemically react with at least 20 percent by weight of the surface of the silica to covalently bond the coupling agent thereto forming the compatibilized silica.

The acrylonitrile and styrene butadiene polymer latex blend can be blended with the compatibilized silica slurry, forming the compatibilized silica in the acrylonitrile and styrene butadiene polymer latex blend.

In one or more embodiments, from about 2 percent to about 80 percent by weight of the styrene polymer latex can be blended with from about 1 percent to about 30 percent by weight of the acrylonitrile butadiene polymer latex, and with from about 1 percent to about 30 percent by weight of the compatibilized silica slurry. The amount of the compatibilized silica slurry can range from about 5 percent to 80 percent based on the weight of the solids in the latexes.

Examples of one or more processes for preparing one or more portions of the polymer composition are described below.

EXAMPLE 1

Preparation of an SBR-Silica-Carbon Black

A. Preparation of Compatibilized Silica Slurry

An aqueous solution of silane can be prepared by charging to a vessel: 55.1 grams (g) of Silquest® A-189 (OSi Specialties), 27 g of isopropanol, 1.1 g of glacial acetic acid, and 27 g of water, which can form an initially cloudy mixture.

The initially cloudy mixture can be agitated at high speed, such as at 50 rpm, and at an elevated temperature ranging from 60 degrees Celsius to 66 degrees Celsius, until the mixture is clear. The high speed agitation can be performed for a time ranging from about 10 minutes to about 20 minutes, after which, an additional 28 g of water can be added, which can cause the mixture to become cloudy.

Agitation can be continued for from about 15 minutes to about 20 minutes until the mixture is clear again and a solution is formed.

To a separate vessel equipped with a stirrer: 16 lb of water and 4.05 lb of fine-particle, dry silica, HiSil® 233 can be charged and agitated for about fifteen minutes to wet and disperse the silica, forming an aqueous solution of silane.

The aqueous solution of silane can then be added, with continued agitation, with 25 percent sodium hydroxide, which can be heated to 76 degrees Celsius. As such, the pH can be increased to 7.5-8.0. The temperature can be maintained at 76 degrees Celsius for about 4 hours, and then allowed to cool to about 60 degrees Celsius. At this point the compatibilized silica slurry can be added to the latex stage of a continuous emulsion process, or can be fed batch-wise to a concentrated polymer latex.

B. Blend of Compatibilized Silica Slurry with SBR Latex

Compatibilized silica slurry can be prepared as described in Part A of Example 1 above. The compatibilized silica slurry can be charged to an agitated vessel containing a mixture of 35 lbs of SBR latex containing 7 lbs or 8 lbs of 1502-type rubber and 6 ppd of an antioxidant emulsion containing Santoflex® 134, which can be held at 60 degrees Celsius.

Hot carbon black slurry can be charged to the initial mixture. For example, about 20 lbs of the hot carbon black slurry containing about 10 percent by weight of N234-type carbon black and about three pounds of hot oil emulsion containing 62.8 percent by weight Sundex® 8125 can be added. This mixture can be agitated for 30 minutes at 60 degrees Celsius and at ambient pressure.

The above latex blend can be instantaneously mixed in the vessel using steam containing from about 45 pounds to about 50 pounds of water and sufficient sulfuric acid to produce a pH of 4.

The rates of addition of the latex blend and the sulfuric acid can be varied to maintain the pH of the resulting coagulation serum in the range of 4-5 pH over the 38 minute time period that the latex blend is added.

An additional 38 minutes of mix time and an additional portion of the acid can be used as needed to allow the product particle size to grow, and to clear the serum of free latex, as is commonly done by those familiar with the art.

The wet composition particle or crumb size achieved by this coagulation can be similar to that obtained from coagulations without silica. Visual inspection and chemical analysis of the dried composition can verify that essentially all solid and liquid components added to the latex mixture are absorbed and uniformly distributed. Silica absorption can be about 96 percent to about 99 percent of charge as estimated by ash analysis.

EXAMPLE 2

Preparation of an SBR-Silica-Carbon Black

A. Preparation of Compatibilized Silica Slurry

An aqueous solution of silane can be prepared by charging to a vessel: 100 g of Silquest® A-189, 50 g of isopropanol, 2 g of glacial acetic acid, and 47 g of water, forming a cloudy mixture. The initially cloudy mixture can be agitated at high speed and room temperature until clear, such as for about 12 minutes to about 22 minutes, after which an additional 50 g of water can be added that can cause the mixture to become cloudy. Agitation can be continued for about 12 minutes to about 22 minutes until the solution is clear.

To a separate vessel equipped with a stirrer: 15 lbs of water and 5 lbs of fine-particle dry silica HiSil® 233 can be charged and agitated for about 20 minutes, such that the silica becomes wet and dispersed. The aqueous solution of silane can then added with continued agitation to 25 percent sodium hydroxide, with the pH being increased to 7.5-8.0. The blend can be heated to about 64 degrees Celsius to 77 degrees Celsius. The temperature can be maintained at 64 degrees Celsius to 77 degrees Celsius for about 3.5 hours, and then allowed to cool to 60 degrees Celsius. At this point the compatibilized silica slurry can be added to the latex stage of a continuous emulsion process or can be fed batch-wise to a concentrated polymer latex.

B. Blend Compatibilized Silica Slurry with SBR Latex

The compatibilized silica slurry, prepared as described in Part A of Example 2 above, can be charged to an agitating vessel containing a latex mixture as described in Example 1. The final composition mixture can be agitated for 35 minutes at 60 degrees Celsius.

The above latex blend can be coagulated, as described in Example 1. The wet composition particle or crumb size achieved by this coagulation can be similar to or slightly larger than that obtained from coagulations without silica, such as a size of 1 centimeter (cm).

Visual inspection and chemical analysis of the dried composition can verify that essentially all solid and liquid components added to the latex mixture are absorbed and uniformly distributed. Silica absorption can be about 96 percent to about 99 percent of charge as estimated by ash analysis.

EXAMPLE 3

Preparation of an SBR-Silica Composition

Compatibilized Silica Slurry, prepared as described in Part A of Example 2 above, can be charged to an agitated vessel containing a latex mixture prepared from 40 lb of SBR latex containing 20 percent by weight of the 1502 SBR and 2 percent by weight Santoflex 134, which can be held at 60 degrees Celsius.

To this mixture, 3 lbs of hot oil emulsion containing 60 percent by weight of Sundex 8125 can be charged. The mixture can then be agitated for 38 minutes while maintaining a temperature of 60 degrees Celsius, after which the hot latex can be slowly charged to another vessel for coagulation to form a dewatered or dry crumb.

The dewatered crumb can be similar in particle size to that of SBR without silica. Visual inspection and chemical analysis of the dry crumb can show that essentially all of the oil and silica added to the latex are absorbed and uniformly distributed. Silica absorption can be 96 percent to 99 percent of the charge as estimated by ash analysis.

EXAMPLE 4

Preparation of an NBR-Silica Composition

A. Preparation of Compatibilized Silica Slurry

An aqueous solution of silane can be prepared by charging to a vessel: 20 g of Silquest® A-189, 15 g of isopropanol, 0.7 g of glacial acetic acid, and 10 g of water, forming an initially cloudy mixture. The initially cloudy mixture can be agitated at high speed and room temperature until clear, such as for about 10 minutes to 20 minutes, after which an additional 15 g of water can be added, which can cause the mixture to become cloudy. Agitation can be continued for about 12 minutes to 25 minutes until the solution is clear.

To a separate vessel equipped with a stirrer: 7 lbs of water and 2 lbs of fine-particle dry silica, HiSil® 233, can be charged and agitated for about 20 minutes, such that the silica becomes wet and dispersed. The aqueous solution of silane can then be added with continued agitation with 25 percent sodium hydroxide, such that the pH is increased to 7.5-8.0. The blend can be heated to 70 degrees Celsius, and maintained there for about 3.5 hours, after which it can be allowed to cool to 60 degree Celsius. At this point, the compatibilized silica slurry can be added to the latex stage of a continuous emulsion process or fed batch-wise to a concentrated polymer latex.

B. Blend Compatibilized Silica Slurry with NBR Latex

Compatibilized silica slurry, prepared according to Part A of Example 4, can be charged to an agitated vessel containing a mixture of: 30 lbs of acrylonitrile butadiene polymer (NBR) latex containing 22 percent by weight Nysyn® 40-5 rubber and 200 grams of antioxidant emulsion containing 16 percent by weight Agerite Geltrol™ (Vanderbilt Chemical), which can be held at 60 degrees Celsius. To this initial mixture, 15 lbs of hot carbon black slurry containing 7 percent by weight N234-type carbon black can be charged. The final mixture can be agitated for 35 minutes at 60 degrees Celsius.

The above latex blend can be slowly added to a larger vessel containing 30 lbs of water and sufficient sulfuric acid to give a pH of 4. The coagulation can be completed as described in previous examples. The wet composition crumb size achieved by this coagulation can be similar to that obtained from NBR coagulations without silica. Visual inspection and chemical analysis of the dried composition can show that essentially all solid and liquid components added to the latex mixture are absorbed and uniformly distributed. Silica absorption can be 96 percent to 99 percent by weight of charge as estimated by ash analysis.

Articles made from this material can include pneumatic tires. Articles formed form the polymer blends disclosed herein can be made by injection molding, extruding, press molding, cutting, milling, rotomolding, or combinations thereof.

EXAMPLE 5

Latex from the emulsion polymerization process can be treated with shortstop to kill or stop the polymerization reaction, and can be further processed to remove unreacted monomers. Residual unreacted monomers can be removed via steam stripping. Finished latex can be routed to latex storage tanks. The finished latex from the storage tanks can be pumped into feed tanks and blended if necessary to achieve the product target molecular weight. The molecular weight can be determined indirectly by measuring Mooney viscosity.

Latex can be continuously pumped from the nitrile latex feed tank and/or the nitrile and styrene butadiene latex feed tank, and can be mixed with antioxidant and/or extender oil at the head tank where all of the components can be mixed together. The mixture can be pumped into a carbex tank or the like and mixed with compatibilized silica slurry, carbon black slurry, or combinations thereof.

The carbex tank can overflow into a first coagulation tank. If neat or pure extender oil is used, as opposed to oil emulsion, the mixture can be routed through a series of in-line static mixers to facilitate thorough mixing and dispersion.

The mixture can flow into a heated and stirred coagulation tank where dilute sulfuric acid coagulant can be added. Aluminum sulfate and calcium chloride can be used as coagulants when running nitrile (NBR) rubber. Acid can be fed based on pH control of the coagulation tank, whereas both alum and calcium chloride can be fed based on flow control. All three coagulants can serve to break the latex emulsion and cause rubber crumb to form. Control of crumb size can be the determining factor for coagulant addition and can take precedent over recipe values.

Tank contents can be thoroughly agitated to produce a vortex in the center of the tank. Process conditions, along with the addition of coagulant chemicals described herein, can coagulate the mixture to form a rubber crumb and water slurry, or crumb slurry.

When coagulated under the conditions described herein, the latex, oil, compatibilized silica slurry, carbon black slurry, antioxidant, and combinations thereof can be evenly dispersed. The crumb slurry can overflow from the first to a second coagulation tank to provide additional residence time for coagulation.

A soap conversion tank can provide for more residence time to complete the coagulation step. Complete coagulation can be achieved before material exits the soap conversion tank to avoid fouling of downstream equipment.

A small amount of coagulation aid can be used during coagulation to facilitate clearing serum and completing coagulation.

Centrifugal dewatering units, or spin dryers, can be used to mechanically reduce the moisture content of pigmented rubber crumb to approximately 35 percent to 40 percent by weight, allowing for a more energy-efficient dryer operation.

Rubber crumb slurry leaving a wash water tank can enter the spin dryer and be thrown against a cylindrical screen. Water can passes through the cylindrical screen and can be removed by gravity at the bottom of the spin dryer. The rubber crumb can move in an upward spiral path and be discharged through an outlet at the top thereof onto a classifier.

The classifier can be a vibrating conveyor equipped with grid bars. Grid spacing of the grid bars can be used to regulate crumb size. Smaller crumbs can fall through the grid bar spaces while over-sized crumbs can remains on top of the grid bars and be ejected via a side exit chute.

Acceptable crumb can be discharged from the classifier into a wet feed rotolock valve that feeds a wet feed crumb blower. The wet feed rotolock valve can prevent blow back from the wet-feed crumb blower.

Rubber crumb can be fluidized in the spin dryer by means of air directed upwards from the bottom of the spin dryer. The upward motion of the air can partially support and suspend the rubber crumb to form a boiling mass.

Dried crumb can be discharged through openings at the end of the last dryer compartment to a crumb hopper. Discharge crumb hoppers can feed the dry crumb blowers. The dry crumb blowers can convey the dry crumb to baler scale cyclones. The rubber crumb can be gravity feed to scales above each baler, where the rubber crumb can be compressed into bale form.

The rubber crumb can be diverted to a bagging operation where it can be coated with a partitioning agent and packaged as a free flowing crumb.

While these embodiments have been described with emphasis on the embodiments, it should be understood that within the scope of the appended claims, the embodiments might be practiced other than as specifically described herein.

What is claimed is:

1. A polymer composition of a compatibilized silica in blends of an emulsion polymerized acrylonitrile butadiene polymer and an emulsion polymerized styrene butadiene polymer, the polymer composition comprising:
   a. from six percent to ninety percent by weight of a compatibilized silica based on a total solids content of the polymer composition, wherein the compatibilized silica comprises at least one percent by weight of an organosilicon coupling agent based on a weight of the compatibilized silica, wherein the organosilicon coupling agent is derived from an organic silane having the structure:

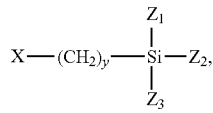

wherein X is a functional group selected from the group consisting of: an amino group, a polyamino alkyl group, a polysulfide, a thiocyanato group, a halogen, an acryloxy group, and a methacryloxy group, wherein y is an integer equal to or greater than 0, or X is a vinyl functional group wherein y is an integer greater than 0, and wherein $Z_1$, $Z_2$, and $Z_3$ are each independently selected from the group consisting of a hydrogen, an alkoxy, a halogen, and a hydroxyl;

b. from ten percent to eighty percent by weight of the emulsion polymerized styrene butadiene polymer; and c. from ten percent to eighty percent by weight of the emulsion polymerized acrylonitrile butadiene polymer, wherein at least ten percent by weight of the emulsion polymerized acrylonitrile butadiene polymer consists of a ratio of acrylonitrile polymer to liquid 1,3-butadiene polymer of 15 parts by weight of acrylonitrile polymer to 50 parts by weight liquid 1,3-butadiene polymer, providing a high strength bond of the compatibilized silica to each of the polymers, wherein butadiene to styrene is in a ratio ranging from 7 parts weight of butadiene to 1 part by weight styrene to 17 parts by weight butadiene to 1 part by weight of styrene and acrylonitrile to butadiene is in a ratio of ranging from 0.04 part by weight of acrylonitrile to 1 part by weight of butadiene to 0.75 part by weight of acrylonitrile to 1 part by weight of butadiene, and wherein silica absorption is from 96 percent to 99 percent of the compatibilized silica and the emulsion polymerized styrene butadiene polymer.

2. The polymer composition of claim 1, further comprising the from ten to fifty percent by weight of the compatibilized silica, wherein the organosilicon coupling agent is chemically bound to a surface of silica of the compatibilized silica, wherein the organosilicon coupling agent is present as an average tetrameric structure having a $T^3/T^2$ ratio of 0.75 or greater as measured by silicon cross polarization magic angle spinning nuclear magnetic resonance, and wherein the compatibilized silica has a $T^3/T^2$ ratio of 0.9 or greater.

3. The polymer composition of claim 2, wherein the organosilicon coupling agent is bound to the surface of silica of the compatibilized silica in amounts ranging from one to twenty five percent by weight of the organosilicon coupling agent based on weight of the silica.

4. The polymer composition of claim 1, wherein the polymer composition comprises a member of the group consisting of: conjugated diene-based polymers, polymers based on vinyl monomers, combinations of conjugated diene with vinyl monomers, polyolefins, polyalphaolefins, polyesters, polyamides, polycarbonates, polyphenylene oxides, polyacrylates, polyurethanes, terpolymer of ethylene propylene and a non-conjugated diene, fluoroelastomer, chloro-elastomers, a polyisoprene, polybutadiene, polyisobutyldiene, polychloroprene, polyvinyl chloride polymer, acrylonitrile butadiene rubber, a polyepoxide, ethylene interpolymers, block copolymers of styrene butadiene, block copolymers of styrene isoprene, copolymers of acrylates, crosslinked monomers, vinyl monomers and combinations thereof.

5. The polymer composition of claim 1, wherein at least one of the polymers is a copolymer, a homopolymer, a cross-linked polymer, a partially cross-linked polymer, or combinations thereof.

6. The polymer composition of claim 1, wherein the compatibilized silica has an average particle size ranging from one nanometer to fifteen microns.

7. The polymer composition of claim 1, wherein a silica used to form the compatibilized silica is a fumed silica, an amorphous silica, or combinations thereof.

8. The polymer composition of claim 1, further comprising from one percent to fifty percent by weight of a carbon black.

9. The polymer composition of claim 1, wherein the organosilicon of the organosilicon coupling agent has from one to three readily hydrolyzable groups attached directly to a silicon atom of the organosilicon coupling agent, and at least one organic group attached directly to the silicon atom, wherein the at least one organic group has at least one functional group, and wherein the at least one functional group is a functional group capable of undergoing a chemical reaction with the polymer composition during curing of the polymer composition.

10. The polymer composition of claim 9, wherein the organosilicon coupling agent is a bis(trialkoxysilylalkyl)polysulfide containing two sulfur atoms to eight sulfur atoms in which alkyl groups are $C_1$-$C_{18}$ alkyl groups and alkoxy groups are $C_1$-$C_8$ alkoxy groups.

11. The polymer composition of claim 1, further comprising an extender oil, an antioxidant, or combinations thereof in amounts from four to sixty percent by weight.

12. The polymer composition of claim 11, wherein the extender oil is a naphthenic oil, a hydrocarbon based oil, a synthetic oil, an aromatic oil, a low polycyclic aromatic hydrocarbon oil, or combinations thereof.

13. The polymer composition of claim 11, wherein the antioxidant is a phenolic antioxidant, a phosphite, a bis-phenol, an amine antioxidant, or combinations thereof.

14. The polymer composition of claim 1, further comprising from 0.1 percent to 50 percent by weight of a filler that is a member of the group consisting of: diatomaceous earth, ground pecan shells, cellulosic materials, ground peanut shells, talc, ground coal, bagasse, ash, perlite, silage, clay, calcium carbonate, biomass, and combinations thereof.

15. The polymer composition of claim 1, further comprising an activator, a free radical inhibitor, and a terminator in an amount ranging from 0.1 percent to 5 percent by weight in combination.

16. The polymer composition of claim 15, wherein the activator is a peroxide.

17. The polymer composition of claim 15, further comprising a curing package for crosslinking polymers using a zinc oxide, an organic peroxide, or an acrylate.

18. An article made from the polymer composition of claim 17.

19. The article of claim 18, wherein the article is: a floor mat, a tire, a belt, a roller, footwear, wire and cable jacketing, roof edging, a tubular hose, a marine impact bumper, an industrial belt, a non-automotive tire, a mining belt, a bearing, a conduit, or a pneumatic tire.

20. The article of claim 19, wherein the article is made by injection molding, extruding, press molding, cutting, milling, rotomolding, or combinations thereof.

* * * * *